(12) United States Patent
Zhu et al.

(10) Patent No.: US 10,976,470 B2
(45) Date of Patent: Apr. 13, 2021

(54) SIMULATION METHOD FOR FLOW FIELD OF MULTI-STAGE FRACTURING ON HORIZONTAL WELL IN TIGHT OIL RESERVOIR

(71) Applicant: UNIVERSITY OF SCIENCE AND TECHNOLOGY BEIJING, Beijing (CN)

(72) Inventors: Weiyao Zhu, Beijing (CN); He Liu, Beijing (CN); Yunfeng Liu, Beijing (CN); Qinglin Shu, Beijing (CN); Zhiyong Song, Beijing (CN); Ming Yue, Beijing (CN); Zenglin Wang, Beijing (CN); Debin Kong, Beijing (CN); Aishan Li, Beijing (CN); Bingbing Li, Beijing (CN); Guodong Zou, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 17/021,099

(22) Filed: Sep. 15, 2020

(65) Prior Publication Data
US 2021/0003742 A1 Jan. 7, 2021

(30) Foreign Application Priority Data

Mar. 26, 2020 (CN) .......................... 202010221579.X

(51) Int. Cl.
*G01V 99/00* (2009.01)
*G06F 30/20* (2020.01)
(Continued)

(52) U.S. Cl.
CPC ............ *G01V 99/005* (2013.01); *E21B 43/26* (2013.01); *E21B 47/06* (2013.01); *E21B 49/00* (2013.01);
(Continued)

(58) Field of Classification Search
CPC ... G06F 30/20; G01V 99/005; E21B 49/0875; E21B 43/26; E21B 49/00; E21B 47/06
(Continued)

(56) References Cited

U.S. PATENT DOCUMENTS

| 10,761,241 B2* | 9/2020 | Zhu | .......................... E21B 49/00 |
| 2006/0277012 A1* | 12/2006 | Ricard | ................... G01V 11/00 |
| | | | 703/10 |

(Continued)

FOREIGN PATENT DOCUMENTS

| CN | 108518212 A | 9/2018 |
| CN | 110348031 A | 10/2019 |

OTHER PUBLICATIONS

Deng et al. ("A new seepage model for shale gas reservoir and productivity analysis of fractured well", Elsevier Ltd., 2014, pp. 232-240), (Year: 2014).*

(Continued)

*Primary Examiner* — Iftekhar A Khan
(74) *Attorney, Agent, or Firm* — IPro, PLLC

(57) ABSTRACT

A simulation method for flow field of multi-stage fracturing on horizontal well in tight oil reservoir is provided. The tight oil reservoir comprises multiple horizontal wells with multi-stage fracturing, and for any horizontal well of the multiple horizontal wells, the method comprises: establishing a seepage mathematical model involving threshold pressure gradient according to reservoir physical property data and production data of the horizontal well, and determining formation pressure distribution of the horizontal well after
(Continued)

multi-stage fracturing production according to the seepage mathematical model; determining formation pressure field distribution of the horizontal well after multi-stage fracturing production according to the formation pressure distribution and basing on principle of complex potential superposition; and establishing a criterion for identifying effective producing range of the horizontal well according to the formation pressure field distribution, and determining flow field range of the horizontal well according to the criterion.

23 Claims, 3 Drawing Sheets

(51) Int. Cl.
  E21B 49/08    (2006.01)
  E21B 43/26    (2006.01)
  E21B 47/06    (2012.01)
  E21B 49/00    (2006.01)
  G06F 113/08   (2020.01)
(52) U.S. Cl.
  CPC .......... *E21B 49/0875* (2020.05); *G06F 30/20* (2020.01); *E21B 2200/20* (2020.05); *G06F 2113/08* (2020.01)
(58) Field of Classification Search
  USPC .......................................................... 703/10
  See application file for complete search history.

(56) References Cited

U.S. PATENT DOCUMENTS

| | | | | |
|---|---|---|---|---|
| 2009/0152005 | A1* | 6/2009 | Chapman | E21B 7/00 175/24 |
| 2011/0127042 | A1* | 6/2011 | Ocalan | E21B 33/138 166/373 |
| 2011/0288843 | A1* | 11/2011 | Weng | E21B 47/103 703/10 |
| 2013/0032350 | A1* | 2/2013 | Potapenko | E21B 43/26 166/308.1 |
| 2015/0066463 | A1* | 3/2015 | Shetty | G06G 7/32 703/10 |
| 2015/0120255 | A1* | 4/2015 | King | E21B 43/00 703/2 |
| 2015/0127313 | A1* | 5/2015 | Lawson | G01N 33/241 703/10 |
| 2015/0186562 | A1* | 7/2015 | Johnson | E21B 43/26 703/2 |
| 2015/0186563 | A1* | 7/2015 | Johnson | E21B 43/26 703/2 |
| 2016/0177676 | A1* | 6/2016 | Lynch | E21B 41/0035 405/285 |
| 2016/0326859 | A1* | 11/2016 | Crews | E21B 41/0035 |
| 2017/0175494 | A1* | 6/2017 | Wang | E21B 43/26 |
| 2017/0212276 | A1* | 7/2017 | Jerbi | G01V 99/005 |
| 2017/0260854 | A1* | 9/2017 | Jin | E21B 47/07 |
| 2018/0016895 | A1* | 1/2018 | Weng | G01V 1/306 |
| 2018/0106139 | A1* | 4/2018 | Osiptsov | E21B 43/267 |
| 2018/0230783 | A1* | 8/2018 | Weng | E21B 43/267 |
| 2018/0258762 | A1* | 9/2018 | Kampfer | E21B 49/008 |
| 2019/0042676 | A1* | 2/2019 | Madasu | E21B 49/00 |
| 2019/0249523 | A1* | 8/2019 | Moghanloo | E21B 49/005 |
| 2019/0271211 | A1* | 9/2019 | Mustapha | G01V 99/005 |
| 2019/0309603 | A1* | 10/2019 | Sepehrnoori | G06F 30/20 |
| 2019/0345803 | A1* | 11/2019 | Madasu | G01V 99/005 |
| 2020/0018145 | A1* | 1/2020 | Hou | E21B 43/2401 |
| 2020/0200929 | A1* | 6/2020 | Sepehrnoori | G01V 1/282 |
| 2020/0224522 | A1* | 7/2020 | Zhu | E21B 41/00 |
| 2020/0301043 | A1* | 9/2020 | Zhu | G01V 99/005 |
| 2021/0003742 | A1* | 1/2021 | Zhu | G06F 30/20 |

OTHER PUBLICATIONS

Feng et al.("Pressure Transient Behavior of Horizontal Well with Time-Dependent Fracture Conductivity in Tight Oil Reservoirs", Hindawi Geofluids, 2017, pp. 1-19) (Year: 2017).*

Xue et al. ("Productivity model for gas reservoirs with open-hole multi-fracturing horizontal wells and optimization of hydraulic fracture parameters", Petroleum 3 (2017) 454-460) (Year: 2017).*

Zhao et al. ("Simulation of a multistage fractured horizontal well in a tight oil reservoir using an embedded discrete fracture model", Energy Sci Eng. 2019;7:1485-1503) (Year: 2019).*

Yao et al. ("A semi-analytical model for multi-stage fractured horizontal wells". Zeng). Journal of Hydrology 507 (2013) 201-212 ) (Year: 2013).*

Analysis of Stress Field of Horizontal Well Fracturing Based on Multi-Field Coupling Effect; Guan Bing, Li Shibin, Zhang Ligang, Chen Shuangqing, Wang Yeqiang; Unconventonal OILandGAS,vol. 4 No. 3, Jun. 2017 ,p. 103-109.

* cited by examiner

SIMULATION METHOD FOR FLOW FIELD OF MULTI-STAGE FRACTURING ON HORIZONTAL WELL IN TIGHT OIL RESERVOIR

TECHNICAL FIELD

The disclosure relates to the technical field of oil and gas field development, and in particular to a simulation method for flow field of multi-stage fracturing on horizontal well in tight oil reservoir.

BACKGROUND

With the decrease of conventional, easy to recover and high-quality oil and gas resources, in order to continue to promote the development of unconventional oil and gas resources, and strive to build a sustainable energy supply system, tight oil reservoirs with huge geological resources are becoming an inevitable choice to replace traditional energy sources.

Tight oil reservoirs have poor physical properties, well-developed nano-micron pore throats, and have strong non-linear seepage characteristics. And compared with the flow characteristics of conventional reservoirs, the threshold pressure gradient of the tight oil reservoirs needs to be additionally considered. Currently, multi-stage fracturing on horizontal well is the main development method for tight oil reservoir. It forms complex fracture network in tight oil reservoir by increasing the amount of fracturing fluid entering into the formation, so as to improve the connectivity of tight oil reservoir.

SUMMARY

A simulation method for flow field of multi-stage fracturing on horizontal well in tight oil reservoir. is provided. The tight oil reservoir comprises multiple horizontal wells with multi-stage fracturing, and for any horizontal well of the multiple horizontal wells, the method comprises: establishing a seepage mathematical model involving threshold pressure gradient according to reservoir physical property data and production data of the horizontal well, and determining formation pressure distribution of the horizontal well after multi-stage fracturing production according to the seepage mathematical model; determining formation pressure field distribution of the horizontal well after multi-stage fracturing production according to the formation pressure distribution and basing on principle of complex potential superposition; and establishing a criterion for identifying effective producing range of the horizontal well according to the formation pressure field distribution, and determining flow field range of the horizontal well according to the criterion.

According to at least one embodiment of the present disclosure, before establishing the seepage mathematical model involving threshold pressure gradient, the method further comprises: obtaining the reservoir physical property data and the production data of the horizontal well. The reservoir physical property data comprises: formation thickness, porosity, permeability, oil saturation, threshold pressure gradient, formation fluid viscosity and initial formation pressure. The production data of the horizontal well comprises bottom hole flowing pressure and volume flow rate.

According to at least one embodiment of the present disclosure, the method further comprises: taking area of a region that meeting the criterion as production area A of the horizontal well, and determining geological reserves produced by the horizontal well according to the production area A.

$$N = A \cdot h \cdot \phi \cdot S_{oi} \cdot \rho_{os}/B_o$$

Wherein, N is geological reserves; A is production area, $m^2$; h is reservoir thickness, m; $\phi$ is porosity; $S_{oi}$ is initial formation oil saturation; $\rho_{os}$ is oil density at surface conditions, $kg/m^3$; and $B_o$ is oil volume factor.

According to at least one embodiment of the present disclosure, the seepage mathematical model of is $$v = \frac{q}{2\pi rh} = \frac{k}{\mu}\left(\frac{dp}{dr} - G\right)$$

wherein, v is the seepage velocity; q is the volume flow rate; r is a distance from any point in the formation to the wellhead; h is the formation thickness; k is the permeability; $\mu$ is the formation fluid viscosity; p is the formation pressure; and G is the threshold pressure gradient.

According to at least one embodiment of the present disclosure, the formation pressure distribution is $$\int_{p(r)}^{p_e} dp = \frac{q\mu}{2\pi kh} \cdot \int_{r}^{r_e} \frac{1}{r} dr + G \cdot (r_e - r)$$

wherein, $p_e$ is the initial formation pressure; and $r_e$ is the supply radius.

According to at least one embodiment of the present disclosure, the formation pressure field distribution is $$\int_{p(r)}^{p_e} dp = \sum_{i=1}^{n}\left[\frac{q_i \mu}{2\pi k_i h} \cdot \int_{r_i}^{r_{ei}} \frac{1}{r_i} dr + G \cdot (r_{ei} - r_i)\right]$$

wherein, i is i-th fracture in multi-stage fracturing; n is multi-stage fracturing stage; $q_i$ is instantaneous flow rate of i-th fracture; $k_i$ is equivalent permeability of flow field near i-th fracture; $r_{ei}$ is supply radius at i-th fracture; and $r_i$ is a distance from any point in the formation to junction of i-th fracture and wellbore of horizontal well.

According to at least one embodiment of the present disclosure, the criterion is that formation pressure drop of the area, where the formation fluid contributing to production is located, conforms to $\Delta p_i = \int_{p(r)}^{p_e} dp \geq G \cdot (r_{ei} - r_i)$.

According to at least one embodiment of the present disclosure, stable seepage mathematical model of a constant-pressure production well in an infinite formation involving the threshold pressure gradient is $$\frac{d^2 p}{dr^2} + \frac{1}{r} \cdot \frac{dp}{dr} - \frac{G}{r} = 0.$$

According to at least one embodiment of the present disclosure, definite conditions of the stable seepage mathematical model are: when $r=r_w$, then $p=p_w$; and when $r=r_t$, then $p=p_e$; wherein, $p_w$ is bottom hole pressure; $p_e$ is initial formation pressure; $r_w$ is wellbore radius; and $r_t$ is dynamic radius.

According to at least one embodiment of the present disclosure, pressure distribution formula at any point in the formation is $$p(r) = p_e - G(r_t - r) - \frac{p_e - p_w - G(r_t - r_w)}{\ln\frac{r_t}{r_w}} \cdot \ln\frac{r_t}{r}.$$

According to at least one embodiment of the present disclosure, after taking derivative of the pressure distribution formula, obtaining driving pressure gradient at any point in the formation:

$$\frac{dp(r)}{dr} = \frac{p_e - p_w - G(r_t - t_w)}{\ln\left(\frac{r_t}{r_w}\right) \cdot r} + G.$$

According to at least one embodiment of the present disclosure, when the driving pressure gradient $$\frac{dp(r)}{dr}$$

is greater than or equal to the threshold pressure gradient G, effective production of tight oil reservoir by the horizontal well can be realized.

A device for simulating flow field of multi-stage fracturing on horizontal well in tight oil reservoir is provided. The device comprises a processor and a memory. The memory stores computer program instructions suitable for execution by the processor, and when the computer program instructions are executed by the processor, one or more steps of the simulation method for flow field of multi-stage fracturing on horizontal well in tight oil reservoir in any of the above embodiments are executed.

BRIEF DESCRIPTION OF FIGURES

The drawings illustrate exemplary embodiments of the present disclosure and are used to explain the principles of the present disclosure together with their descriptions. These drawings are included to provide a further understanding of the present disclosure, and the drawings are included in this specification and constitute a part of this specification.

DETAILED DESCRIPTION

Figure 1:
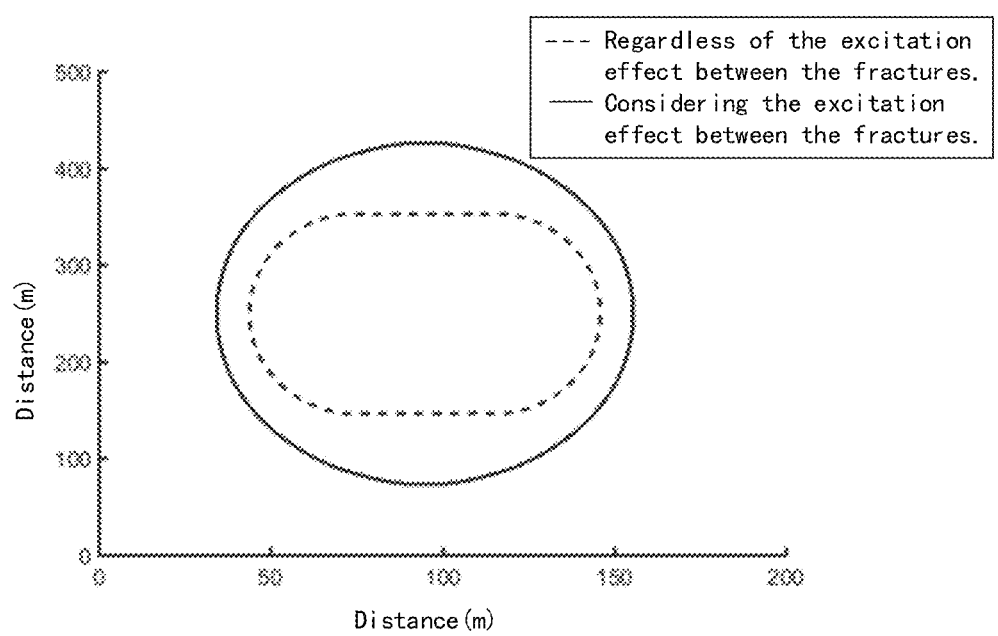
FIG. 1 is a flow field of multi-stage fracturing on horizontal well in tight oil reservoir with a fracture spacing of 10 m calculated according to a simulation method of at least one embodiment of the present disclosure.

The disclosure will be further described in detail below with reference to the drawings and embodiments. It can be understood that the specific embodiments described herein are only used for explaining related content, rather than limiting the present disclosure. It should also be noted that, for ease of description, only parts related to the present disclosure are shown in the drawings.

It should be noted that the embodiments in the present disclosure and the features in the embodiments can be combined with each other without conflict. The disclosure will be described in detail below with reference to the drawings and in conjunction with the embodiments.

It should be noted that the step numbers in the text are only used to facilitate the explanation of the specific embodiments, and are not used to limit the order of execution of the steps. The method provided by some embodiments of the present disclosure can be executed by a related processor, and the following descriptions are made by taking the processor as the execution body as an example. The executive body can be adjusted according to specific cases, such as servers, electronic devices, computers, etc.

The mathematical description of the structural characteristics of complex fracture networks formed by multi-stage fracturing has always been a limiting factor that affects the accuracy of productivity prediction. There are different flow mechanisms for fluids in flow channels of different scales. In order to simplify the solution difficulty, the most common method at present is to describe the zoning of the reservoir after fracturing. According to the size of the flow channel, it is divided into artificial fracture reconstruction area, derivative fracture network area where the fracture and matrix coexist, and a matrix flow area where the fracture fails to spread. This method has a wide range of applications for the elliptical flow field formed by a single crack of a horizontal well. In the process of simulating the flow field of multi-stage fracturing on horizontal well, the flow fields formed by a single fracture are only superimposed, and the complex flow field formed by the interaction between fractures is ignored. The flow field formed by multi-stage fracturing on horizontal well in tight oil reservoir must consider not only the elliptical flow field formed by a single fracture, but also the interaction between fractures.

In view of the limitations of the superimposed simulation method for single-fracture flow field, based on the nonlinear seepage laws and basic theories and methods of seepage mechanics in tight oil reservoirs obtained from laboratory experiments, at least one embodiment of the present disclosure provides a simulation method for flow field of multi-stage fracturing on horizontal well in tight oil reservoir, the tight oil reservoir comprises multiple horizontal wells with multi-stage fracturing, and for any horizontal well of the multiple horizontal wells, the method comprises S1~S3.

S1, establishing a seepage mathematical model involving threshold pressure gradient according to reservoir physical property data and production data of the horizontal well, as well as the nonlinear seepage characteristics of tight oil reservoirs, and determining formation pressure distribution of the horizontal well after multi-stage fracturing production according to the seepage mathematical model;

S2, considering the mutual interference of multiple fractures of the horizontal well, determining formation pressure field distribution of the horizontal well after multi-stage fracturing production according to the formation pressure distribution and basing on principle of complex potential superposition; and S3, establishing a criterion for identifying effective producing range of the horizontal well according to the formation pressure field distribution, and determining flow field range of the horizontal well according to the criterion.

In some embodiments, before establishing the seepage mathematical model involving threshold pressure gradient, the method further comprises: S11, obtaining the reservoir physical property data and the production data of the horizontal well. The reservoir physical property data comprises: formation thickness, porosity, permeability, oil saturation, threshold pressure gradient, formation fluid viscosity and initial formation pressure. The production data of the horizontal well comprises bottom hole flowing pressure and volume flow rate.

The simulation method for flow field of multi-stage fracturing on horizontal well in tight oil reservoir provided by some embodiments of the present disclosure can more accurately simulate the effective production range of the horizontal well, and improve the numerical simulation accuracy of flow field of multi-stage fracturing on horizontal well. It provides a basis for scientifically formulating the follow-up development strategy of tight oil reservoirs, and then achieves the purpose of improving oil recovery.

In some embodiments, the method further comprises: S4, taking area of a region that meeting the criterion as production area A of the horizontal well, and determining geological reserves produced by the horizontal well according to the production area A.

$$N = A \cdot h \cdot \phi \cdot S_{oi} \cdot \rho_{os}/B_o$$

Wherein, N is geological reserves; A is production area, $m^2$; h is reservoir thickness, m; $\phi$ is porosity; $S_{oi}$ is initial formation oil saturation; $\rho_{os}$ is oil density at surface conditions, $kg/m^3$; and $B_o$ is oil volume factor.

In the process of calculating the produced reserves of horizontal well with multi-stage fracture, the criterion in some embodiments of the present disclosure can be used to more accurately simulate the effective production range of the horizontal well, and make the determined production area A more consistent with the actual production data of the horizontal well in the formation, so that the calculated geological reserves produced by the horizontal well is closer to the actual production conditions of the reserve production data, providing a basis for the subsequent formulation and improvement of tight oil reservoir development strategies.

For any horizontal well of the multiple horizontal wells, firstly, aiming at the nonlinear seepage characteristics of tight oil reservoirs, establishing a seepage mathematical model involving threshold pressure gradient and determining formation pressure distribution of the horizontal well after multi-stage fracturing production according to the seepage mathematical model. Tight oil reservoirs have poor physical properties, developed nano-micron pore throats, and have strong non-linear seepage characteristics. Compared with the conventional reservoirs, the threshold pressure gradient of the tight oil reservoirs needs to be additionally considered, that is, the fluid in the tight oil reservoir needs a pressure difference greater than the threshold pressure gradient to achieve effective production.

Based on the basic theory of seepage mechanics, for a plane radial stable seepage, the continuity equation meets:

$$\frac{1}{r}\nabla(\rho v \cdot r) = 0 \quad (1)$$

wherein, r is the distance from any point in the formation to the wellhead, m; $\rho$ is the formation fluid density, $kg/m^3$; and v is the seepage velocity, m/s.

Considering the effect of threshold pressure gradient, the equation of motion can be expressed as:

$$v = \frac{k}{\mu}(\nabla p - G) \quad (2)$$

wherein, k is the permeability, $10^{-3} \mu m^2$; $\mu$ is the formation fluid viscosity, mPa·s; p is the formation pressure, MPa; and G is the threshold pressure gradient, MPa/m.

Let $$m = \nabla p - G \quad (3)$$

substituting the equation of motion (2) into the continuity equation (3) to obtain a stable seepage mathematical model of a constant-pressure production well in an infinite formation involving the threshold pressure gradient:

$$\frac{d^2 p}{dr^2} + \frac{1}{r} \cdot \frac{dp}{dr} - \frac{G}{r} = 0 \quad (4)$$

The definite conditions of the stable seepage mathematical model are:

① Inner boundary constant pressure production: when $r = r_w$, then $p = p_w$; and ② The outer boundary is a dynamic ripple boundary, as production and development progress gradually, when $r = r_t$, then $p = p_e$.

Introducing the power integral function to solve the pressure distribution equation considering the threshold pressure gradient, and the pressure expression at any point in the formation is:

$$p(r) = p_e - G(r_t - r) - \frac{p_e - p_w - G(r_t - r_w)}{\ln \frac{r_t}{r_w}} \cdot \ln \frac{r_t}{r} \quad (5)$$

wherein, $p_e$ is initial formation pressure, MPa; $p_w$ is bottom hole pressure, MPa; $r_w$ is wellbore radius, m; and $r_t$ is dynamic radius, m.

The driving pressure gradient $$\frac{dp(r)}{dr}$$

at any point in the formation can be obtained by taking derivative of r in equation (5). When $$\frac{dp(r)}{dr} \geq G,$$

it means that the formation fluid in that place participates in seepage, otherwise it is considered that effective production cannot be realized.

$$\frac{dp(r)}{d_r} = \frac{p_e - p_w - G(r_t - r_w)}{\ln\left(\frac{r_t}{r_w}\right) \cdot r} + G \quad (6)$$

Based on the above formula (6), the pressure gradient of the tight oil reservoir is negatively correlated with the distance from the bottom of the well, and when $p_e-p_w-G(r_t-r_w)>0$, the tight oil reservoir can be effectively produced.

According to the steady-state sequential replacement method, the pressure expansion rate in tight oil reservoirs is extremely slow, especially when $p_e-p_w-G(r_t-r_w)\approx 0$, it can be approximately regarded as a steady state. The seepage mathematical model considering the threshold pressure gradient is:

$$v = \frac{q}{2\pi r h} = \frac{k}{\mu}\left(\frac{dp}{d_r} - G\right) \quad (7)$$

wherein, q is the volume flow rate, m³/s; and h is the formation thickness, m.

Integrating the above formula (7) at $[r,r_e]$, the following formula can be got.

$$\int_{p(r)}^{p_e} dp = \frac{q\mu}{2\pi k h} \cdot \int_r^{r_e} \frac{1}{r} dr + G \cdot (r_e - r) \quad (8)$$

Wherein, $r_e$ is the supply radius, m.

Secondly, considering the mutual interference of multiple fractures of horizontal well, according to formation pressure distribution and basing on principle of complex potential superposition, determining formation pressure field distribution of the horizontal well after multi-stage fracturing production. The process is as follows.

After the multi-stage fracturing on horizontal wells, adjacent fractures have mutual excitation effects during the production process, and the above formula (8) is transformed into:

$$\int_{p(r)}^{p_e} dp = \sum_{i=1}^{n}\left[\frac{q_i\mu}{2\pi k_i h} \cdot \int_{r_i}^{r_{ei}} \frac{1}{r_i} dr + G \cdot (r_{ei} - r_i)\right] \quad (9)$$

wherein, i is the i-th fracture in multi-stage fracturing; n is the multi-stage fracturing stage; $q_i$ is the instantaneous flow rate of the i-th fracture, m³/s; $k_i$ is the equivalent permeability of the flow field near the i-th fracture, $10^{-3}$ μm²; $r_{ei}$ is the supply radius at the i-th fracture, m; and $r_i$ is the distance from any point in the formation to the junction of the i-th fracture and the horizontal wellbore, m.

Since the flow field formed by multi-stage fracturing is elliptical, it is necessary to convert the z plane to the w plane for equivalent calculation, and introduce the Rukovsky function:

$$z = \frac{x_f}{2}\left(w + \frac{1}{w}\right) \quad (10)$$

wherein, $z=x+iy$ and $w=u+iv=M\cdot e^{i\theta}$ (i represents the imaginary part of the real number), then:

$$x + iy = \frac{x_f}{2}\left(M\cdot e^{i\theta} + \frac{1}{M}\cdot e^{-i\theta}\right) = \frac{x_f}{2}\left[\left(M + \frac{1}{M}\right)\cos\theta + i\left(M - \frac{1}{M}\right)\sin\theta\right] \quad (11)$$

Let $a = \frac{x_f}{2}\left(M + \frac{1}{M}\right)$ and $b = \frac{x_f}{2}\left(M - \frac{1}{M}\right)$, then:

$$x + iy = a\cos\theta + ib\sin\theta \quad (12)$$

The focal length of the elliptical flow field corresponding to the z plane is $x_f$, and by combining a and b, then:

$$M = \frac{a+b}{x_f} \quad (13)$$

Wherein: $x_f$ is the half-length of the fracture, m; a is the major axis distance of the elliptical seepage area, m; b is the minor axis distance of the elliptical seepage area, m; and M is the radius of the circle mapped by the z plane pattern on the w plane, m.

To sum up, the unit circle on the w plane corresponds to the line sink whose half length is $x_f$ on the z plane. Similarly, an elliptical region with a major axis a and a minor axis b is mapped to a circular seepage field with a radius $(a+b)/x_f$.

According to any point (x,y) and focal length $x_f$ in the formation, calculating the major axis and minor axis of the confocal ellipse as a' and b' respectively, and then according to the formula:

$$M = \frac{a'+b'}{x_f} \quad (14)$$

calculating the equivalent seepage radius $r_t$, then the pressure p(r) at any point in the multi-stage fracturing on horizontal well development formation in tight oil reservoir can be obtained.

Finally, establishing a criterion for identifying effective producing range of the horizontal well according to the formation pressure field distribution, and determining flow field range of the horizontal well according to the criterion. The process is as follows.

According to equation (9), it can be concluded that when $q_i\geq 0$, according to the formation pressure field distribution, for the i-th hydraulic fracturing stage, when formation pressure drop in a certain area meets $\Delta p_i=\int_{p(r)}^{P_e}dp\geq G\cdot(r_{ei}-r_i)$, the formation fluid in the area is considered to contribute to production.

In the following, based on the geological characteristic parameters of well field 233 in the Maling West of the Ordos Basin, and taking the horizontal well E with multi-stage fracture in this well field as an example, the methods of some embodiments of the present disclosure will be introduced.

In the actual production process, the formation pressure drop of well field 233 in the Maling West shows a dynamic outward propagation. Taking the dynamic sweep radius $r_t$ at time t as an example, and comparing and calculating the different flow field of horizontal well E with fracture spacings of 10 m, 40 m, and 70 m when fracturing five stages. The specific steps are as follows.

Firstly, according to formula (5), obtaining the pressure distribution of each stage when the pressure affects the equivalent radius $r_t$ in the w plane.

Secondly, according to the Rukovsky transformation, mapping the circular flow field to the Z plane to obtain the pressure distribution map of the elliptical flow field of horizontal well E after volume fracturing development of the tight oil reservoir.

Thirdly, according to the criterion for identifying effective producing range of the horizontal well, determining flow field range of the horizontal well E, that is, the flow field range when $\Delta p_i - G \cdot (r_{ei} - r_i) \geq 0$.

Figure 2:
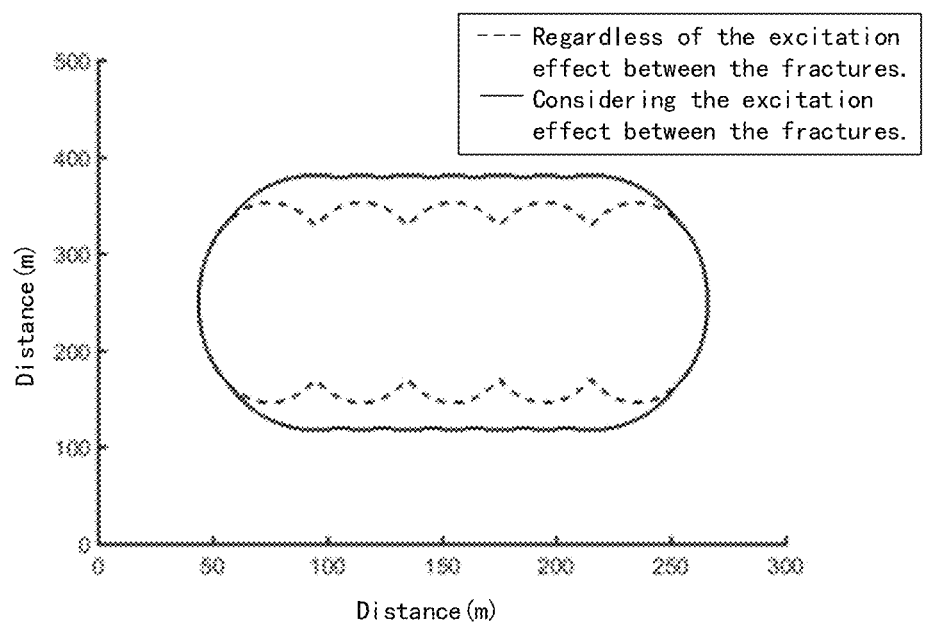
FIG. 2 is a flow field of multi-stage fracturing on horizontal well in tight oil reservoir with a fracture spacing of 40 m calculated according to a simulation method of at least one embodiment of the present disclosure.
Figure 3:
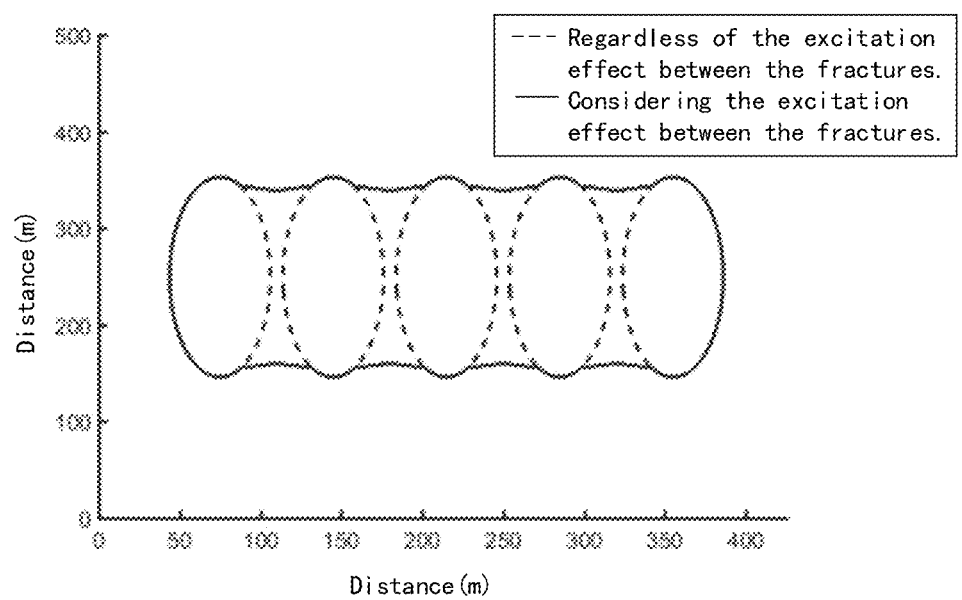
FIG. 3 is a flow field of multi-stage fracturing on horizontal well in tight oil reservoir with a fracture spacing of 70 m calculated according to a simulation method of at least one embodiment of the present disclosure.

Comparing the obtained flow field with the flow field obtained by traditional single-fracture superposition principle, and the details are shown in FIG. 1~FIG. 3. It can be seen from the figures that the simulation method for flow field of multi-stage fracturing on horizontal well in tight oil reservoir provided by some embodiments of the present disclosure can more accurately simulate the effective production range of horizontal well, and improve the numerical simulation accuracy of multi-stage fracturing flow field of horizontal well. It provides a basis for scientifically formulating the follow-up development strategy of tight oil reservoirs, and then achieves the purpose of improving oil recovery.

Taking area of a region that meeting the criterion as production area A of the horizontal well E. Calculating the geological reserves produced by horizontal well E according to the volume method:

$$N = A \cdot h \cdot \phi \cdot S_{oi} \cdot \rho_{os} / B_o \qquad (15)$$

wherein, N is geological reserves; A is production area, $m^2$; h is reservoir thickness, m; $\phi$ is porosity; $S_{oi}$ is initial formation oil saturation; $\rho_{os}$ is oil density at surface conditions, $kg/m^3$; and $B_o$ is oil volume factor.

The reservoir thickness of well field 233 in the Maling West is 15 m, the porosity is 10%, the initial formation oil saturation is 70%, the oil density at surface conditions is 850 $kg/m^3$, and the oil volume factor is 1.15.

When the fracture spacing is 10 m, the geological reserves of horizontal well E is 26,097 tons. The geological reserves calculated by the simulation method of traditional single-fracture superposition principle is 14,235 tons, and the geological reserves is underestimated by 45.5%.

When the fracture spacing is 40 m, the geological reserves of horizontal well E is 40,500 tons. The geological reserves calculated by the simulation method of traditional single-fracture superposition principle is 31,442 tons, and the geological reserves is underestimated by 22.37%.

When the fracture spacing is 70 m, the geological reserves of horizontal well E is 48,787 tons. The geological reserves calculated by the simulation method of traditional single-fracture superposition principle is 38,682 tons, and the geological reserves is underestimated by 20.71%.

It can be seen from the above that the simulation method of traditional single-fracture superposition principle has the problem of underestimating the produced geological reserves. The method provided in some embodiments of the present disclosure takes into account the mutual excitation between the fractures, and the calculation result can be closer to the actual formation situation. When the fracture spacing is small, the excitation effect between fractures is significant, leading to a serious underestimation of the produced geological reserves by traditional calculation methods. As the fracture spacing increases, the excitation effect between fractures gradually weakens. Some embodiments of the present disclosure can more accurately simulate the effective production range of a horizontal well, and make the determined production area A more consistent with the actual production data of the horizontal well in the formation, thereby making the calculated geological reserves of horizontal well is more close to the actual production data, which provides a basis for the development strategy formulation and improvement of tight reservoir.

The method provided by some embodiments of the present disclosure firstly according to reservoir physical property data and production data of horizontal well, establishing a mathematical model of seepage involving threshold pressure gradient and determining formation pressure distribution of the horizontal well after multi-stage fracturing production according to the mathematical model of seepage; secondly according to formation pressure distribution and based on principle of complex potential superposition, determining formation pressure field distribution of the horizontal well after multi-stage fracturing production; and finally according to the formation pressure field distribution, establishing a criterion for identifying effective producing range of the horizontal well. and describing the flow field of multi-stage fracturing in tight oil reservoir more accurately, and revealing the seepage mechanism of the combined action of multiple fractures in tight oil reservoir to overcome the threshold pressure gradient, that is, the flow field of multiple fractures is affected by the fracture spacing and is characterized by the excitation effect between the fractures, which has an additional production area compared with the elliptical flow field of a single fracture.

Some embodiments of the present disclosure can more accurately simulate the flow field of multi-stage fracturing on horizontal well in tight oil reservoir, and has guiding significance for the arrangement on horizontal well pattern and the optimization of fracture spacing in the subsequent development of tight oil reservoirs. Compared with the single fracture flow field superposition method currently widely used, the present disclosure is closer to the actual production and more accurately describes the flow field of multi-stage fracturing on horizontal well in tight oil reservoir, which has guiding significance for the efficient development of tight oil reservoirs.

A device for simulating flow field of multi-stage fracturing on horizontal well in tight oil reservoir is provided. The device comprises a processor and a memory.

The processor is configured to support the device for simulating flow field of multi-stage fracturing on horizontal well in tight oil reservoir to perform one or more steps in the above-mentioned simulation method for flow field of multi-stage fracturing on horizontal well in tight oil reservoir. The processor may be a central processing unit (CPU for short), or other general-purpose processors, digital signal processors (DSP), application-specific integrated circuits (ASIC), field programmable gate arrays (FPGA) or other programming logic devices, discrete gates or transistor logic devices, discrete hardware components, etc. Among them, the general-purpose processor may be a microprocessor or the processor may also be any conventional processor.

The memory stores computer program instructions suitable for execution by the processor, and when the computer program instructions are executed by the processor, one or more steps of the simulation method for flow field of multi-stage fracturing on horizontal well in tight oil reservoir in any of the above embodiments are executed.

The memory can be a read-only memory (ROM) or other types of static storage devices that can store static information and instructions, random access memory (RAM) or other types of dynamic storage devices that can store information and instructions. The memory can also be electrically erasable programmable read-only memory (EEPROM), compact disc read-only memory (CD-ROM) or other optical disc storage, optical disc storage (comprising compact disc, Laser discs, optical discs, digital universal discs, Blu-ray discs, etc.), magnetic disk storage media or other magnetic storage devices, or any other medium that can be used to carry or store desired program codes in the form of instructions or data structures and that can be accessed by a computer, but not limited to this. The memory can exist independently and is connected to the processor through a communication bus. The memory can also be integrated with the processor.

Those skilled in the art should understand that the above-mentioned embodiments are only for clearly illustrating the present disclosure, rather than limiting the scope of the present disclosure. For those skilled in the art, other changes or modifications can be made on the basis of the above disclosure, and these changes or modifications are still within the scope of the present disclosure.

What is claimed is:

1. A simulation method for a flow field of multi-stage fracturing on a horizontal well in a tight oil reservoir comprising multiple horizontal wells with multi-stage fracturing, and for any horizontal well of the multiple horizontal wells, the method comprises:
   establishing a seepage mathematical model involving threshold pressure gradient according to reservoir physical property data and production data of the horizontal well, and determining formation pressure distribution of the horizontal well after multi-stage fracturing production according to the seepage mathematical model;
   determining formation pressure field distribution of the horizontal well after multi-stage fracturing production according to the formation pressure distribution and based on principle of complex potential superposition; and
   establishing a criterion for identifying effective producing range of the horizontal well according to the formation pressure field distribution, and determining the effective producing range of the horizontal well according to the criterion;
   drilling the horizontal well based on the effective producing range;
   wherein the method further comprises:
   taking area of a region that meeting the criterion as production area A of the horizontal well, and determining geological reserves produced by the horizontal well according to the production area A;

$$N = A \cdot h \cdot \phi \cdot S_{oi} \cdot \rho_{os}/B_o$$

wherein, N is geological reserves; A is production area; h is reservoir thickness; $\phi$ is porosity; $S_{oi}$ is initial formation oil saturation; $\rho_{os}$ is oil density at surface conditions; and $B_o$ is oil volume factor.

2. The method according to claim 1, wherein before establishing the seepage mathematical model involving threshold pressure gradient, the method further comprises: obtaining the reservoir physical property data and the production data of the horizontal well;
   the reservoir physical property data comprises formation thickness, porosity, permeability, oil saturation, threshold pressure gradient, formation fluid viscosity and initial formation pressure; and
   the production data of the horizontal well comprises bottom hole flowing pressure and volume flow rate.

3. The method according to claim 1, wherein the seepage mathematical model is $$v = \frac{q}{2\pi r h} = \frac{k}{\mu}\left(\frac{dp}{dr} - G\right)$$

wherein, V is seepage velocity; q is volume flow rate; r is a distance from any point in formation to wellhead; h is formation thickness; k is permeability; $\mu$ is formation fluid viscosity; p is formation pressure; and G is threshold pressure gradient.

4. The method according to claim 3, wherein the formation pressure distribution is $$\int_{p(r)}^{p_e} dp = \frac{q\mu}{2\pi k h} \cdot \int_r^{r_e} \frac{1}{r} dr + G \cdot (r_e - r)$$

wherein, $p_e$ is initial formation pressure; and $r_e$ is supply radius.

5. The method according to claim 4, wherein the formation pressure field distribution is $$\int_{p(r)}^{p_e} dp = \sum_{i=1}^{n}\left[\frac{q_i\mu}{2\pi k_i h} \cdot \int_{r_i}^{r_{ei}} \frac{1}{r_i} dr + G \cdot (r_{ei} - r_i)\right]$$

wherein, i is i-th fracture in multi-stage fracturing; n is multi-stage fracturing stage; $q_i$ is instantaneous flow rate of i-th fracture; $k_i$ is equivalent permeability of flow field near i-th fracture; $r_{ei}$ is supply radius at i-th fracture; and $r_i$ is a distance from any point in the formation to junction of i-th fracture and wellbore of horizontal well.

6. The method according to claim 5, wherein the criterion is that
   formation pressure drop of the area, where the formation fluid contributing to production is located, conforms to $\Delta p_i = \int_{p(r)}^{p_e} dp \geq G \cdot (r_{ei} - r_i)$.

7. The method according to claim 3, wherein stable seepage mathematical model of a constant-pressure production well in an infinite formation involving the threshold pressure gradient is $$\frac{d^2p}{dr^2} + \frac{1}{r} \cdot \frac{dp}{dr} - \frac{G}{r} = 0.$$

8. The method according to claim 7, wherein definite conditions of the stable seepage mathematical model are:
   when $r = r_w$, then $p = p_w$; and
   when $r = r_t$, then $p = p_e$;
   wherein, $p_w$ is bottom hole pressure; $p_e$ is initial formation pressure; $r_w$ is wellbore radius; and $r_t$ is dynamic radius.

9. The method according to claim 8, wherein pressure distribution formula at any point in the formation is $$p(r) = p_e - G(r_t - r) - \frac{p_e - p_w - G(r_t - r_w)}{\ln\frac{r_t}{r_w}} \cdot \ln\frac{r_t}{r}.$$

10. The method according to claim 9, wherein after taking derivative of the pressure distribution formula, obtaining driving pressure gradient at any point in the formation:

$$\frac{dp(r)}{dr} = \frac{p_e - p_w - G(r_t - r_w)}{\ln\left(\frac{r_t}{r_w}\right) \cdot r} + G.$$

11. The method according to claim 10, wherein when the driving pressure gradient $$\frac{dp(r)}{dr}$$

is greater than or equal to the threshold pressure gradient G, effective production of tight oil reservoir by the horizontal well can be realized.

12. A device for simulating flow field of multi-stage fracturing on horizontal well in tight oil reservoir, wherein the device comprises a processor and a memory, and the memory stores computer program instructions suitable for execution by the processor, and when the computer program instructions are executed by the processor, one or more steps of the simulation method for flow field of multi-stage fracturing on horizontal well in tight oil reservoir according to claim 1 are executed.

13. A simulation method for a flow field of multi-stage fracturing on a horizontal well in a tight oil reservoir comprising multiple horizontal wells with multi-stage fracturing, and for any horizontal well of the multiple horizontal wells, the method comprises:
  establishing a seepage mathematical model involving threshold pressure gradient according to reservoir physical property data and production data of the horizontal well, and determining formation pressure distribution of the horizontal well after multi-stage fracturing production according to the seepage mathematical model;
  determining formation pressure field distribution of the horizontal well after multi-stage fracturing production according to the formation pressure distribution and based on principle of complex potential superposition; and
  establishing a criterion for identifying effective producing range of the horizontal well according to the formation pressure field distribution, and determining the effective producing range of the horizontal well according to the criterion;
  drilling the horizontal well based on the effective producing range;
  wherein the seepage mathematical model is $$v = \frac{q}{2\pi rh} = \frac{k}{\mu}\left(\frac{dp}{dr} - G\right)$$

wherein, V is seepage velocity; q is volume flow rate; r is a distance from any point in formation to wellhead; h is formation thickness; k is permeability; μ is formation fluid viscosity; p is formation pressure; and G is threshold pressure gradient.

14. The method according to claim 13, wherein before establishing the seepage mathematical model involving threshold pressure gradient, the method further comprises: obtaining the reservoir physical property data and the production data of the horizontal well;
  the reservoir physical property data comprises formation thickness, porosity, permeability, oil saturation, threshold pressure gradient, formation fluid viscosity and initial formation pressure; and
  the production data of the horizontal well comprises bottom hole flowing pressure and volume flow rate.

15. The method according to claim 13, wherein the formation pressure distribution is $$\int_{p(r)}^{p_e} dp = \frac{q\mu}{2\pi kh} \cdot \int_r^{r_e} \frac{1}{r} dr + G \cdot (r_e - r)$$

wherein, $p_e$ is initial formation pressure; and $r_e$ is supply radius.

16. The method according to claim 15, wherein the formation pressure field distribution is $$\int_{p(r)}^{p_e} dp = \sum_{i=1}^{n} \left[\frac{q_i \mu}{2\pi k_i h} \cdot \int_{r_i}^{r_{ei}} \frac{1}{r_i} dr + G \cdot (r_{ei} - r_i)\right]$$

wherein, i is i-th fracture in multi-stage fracturing; n is multi-stage fracturing stage; $q_i$ is instantaneous flow rate of i-th fracture; $k_i$ is equivalent permeability of flow field near i-th fracture; $r_{ei}$ is supply radius at i-th fracture; and $r_i$ is a distance from any point in the formation to junction of i-th fracture and wellbore of horizontal well.

17. The method according to claim 16, wherein the criterion is that
  formation pressure drop of the area, where the formation fluid contributing to production is located, conforms to $\Delta p_i = \int_{p(r)}^{P_e} dp \geq G \cdot (r_{ei} - r_i)$.

18. The method according to claim 13, wherein stable seepage mathematical model of a constant-pressure production well in an infinite formation involving the threshold pressure gradient is $$\frac{d^2 p}{dr^2} + \frac{1}{r} \cdot \frac{dp}{dr} - \frac{G}{r} = 0.$$

19. The method according to claim 18, wherein definite conditions of the stable seepage mathematical model are:
  when $r = r_w$, then $p = p_w$; and
  when $r = r_t$, then $p = p_e$;
  wherein, $p_w$ is bottom hole pressure; $P_e$ is initial formation pressure; $r_w$ is wellbore radius; and $r_t$ is dynamic radius.

20. The method according to claim 19, wherein pressure distribution formula at any point in the formation is $$p(r) = p_e - G(r_t - r) - \frac{p_e - p_w - G(r_t - r_w)}{\ln \frac{r_t}{r_w}} \cdot \ln \frac{r_t}{r}.$$

21. The method according to claim 20, wherein after taking derivative of the pressure distribution formula, obtaining driving pressure gradient at any point in the formation:

$$\frac{dp(r)}{dr} = \frac{p_e - p_w - G(r_t - r_w)}{\ln\left(\frac{r_t}{r_w}\right) \cdot r} + G.$$

22. The method according to claim 21, wherein when the driving pressure gradient $$\frac{dp(r)}{dr}$$

is greater than or equal to the threshold pressure gradient G, effective production of tight oil reservoir by the horizontal well can be realized.

23. A device for simulating flow field of multi-stage fracturing on horizontal well in tight oil reservoir, wherein the device comprises a processor and a memory, and the memory stores computer program instructions suitable for execution by the processor, and when the computer program instructions are executed by the processor, one or more steps of the simulation method for flow field of multi-stage fracturing on horizontal well in tight oil reservoir according to claim 13 are executed.

* * * * *